US012680989B2

(12) United States Patent
Kessler et al.

(10) Patent No.: US 12,680,989 B2
(45) Date of Patent: Jul. 14, 2026

(54) METHOD OF BIOANALYTICAL ANALYSIS UTILIZING ION SPECTROMETRY, INCLUDING MASS ANALYSIS

(71) Applicant: Bruker Daltonics GmbH & Co. KG, Bremen (DE)

(72) Inventors: Nikolas Kessler, Bremen (DE); Matthew Lewis, Coventry (GB)

( * ) Notice: Subject to any disclaimer, the term of this patent is extended or adjusted under 35 U.S.C. 154(b) by 305 days.

(21) Appl. No.: 18/654,451

(22) Filed: May 3, 2024

(65) Prior Publication Data

US 2024/0369516 A1    Nov. 7, 2024

Related U.S. Application Data

(60) Provisional application No. 63/499,766, filed on May 3, 2023.

(51) Int. Cl.
| | |
|---|---|
| *G01N 30/72* | (2006.01) |
| *G01N 35/00* | (2006.01) |
| *H01J 49/40* | (2006.01) |
| *H01J 49/42* | (2006.01) |
| *G01N 30/02* | (2006.01) |

(52) U.S. Cl.
CPC ... *G01N 30/7233* (2013.01); *G01N 35/00613* (2013.01); *H01J 49/401* (2013.01); *H01J 49/4215* (2013.01); *G01N 2030/027* (2013.01)

(58) Field of Classification Search
CPC ......... G01N 30/7233; G01N 35/00613; G01N 2030/027; H01J 49/401; H01J 49/4215
See application file for complete search history.

(56) References Cited

U.S. PATENT DOCUMENTS

| | | | |
|---|---|---|---|
| 6,940,065 B2 | 9/2005 | Graber et al. | |
| 10,217,619 B2 | 2/2019 | Yip et al. | |
| 10,937,639 B2 | 3/2021 | Decker | |
| 11,569,078 B2 | 1/2023 | Easterling | |
| 2018/0024132 A1* | 1/2018 | Kiebish ............ | G01N 33/57555 |
| | | | 435/7.23 |
| 2019/0371585 A1 | 12/2019 | Decker | |
| 2023/0172930 A1* | 6/2023 | Huang ................. | A61K 31/506 |
| | | | 514/256 |

FOREIGN PATENT DOCUMENTS

| | | |
|---|---|---|
| GB | 2553398 A | 3/2018 |

OTHER PUBLICATIONS

King et al. "Development of a rapid profiling method for the analysis of polar analytes in urine using HILIC-MS and ion mobility enabled HILIC-MS", Metabolomics, 15 (17).

(Continued)

*Primary Examiner* — Nicole M Ippolito
(74) *Attorney, Agent, or Firm* — DECODE Legal Inc.

(57)    ABSTRACT

The disclosure relates generally to analytical measurement and, more specifically, to the use of ion spectrometry, including mass analysis, for the quantitation and chemical characterization (e.g., identification) of biological or synthetic materials using two different ion spectrometric measurement cycles. The methods may be employed fruitfully in particular with analyte molecules of low molecular weight, such as metabolites.

26 Claims, 4 Drawing Sheets

Using Feature Table A to annotate Feature Table B

(56)             References Cited

OTHER PUBLICATIONS

Resolution in Three Dimensions—Synapt G2-Si, Waters [online]. [retrieved on Nov 15, 2024]. Retrieved from the Internet: <URL:https://www.waters.com/webassets/cms/library/docs/720004681en.pdf?srsltid=AfmBOoooCk87fns8KbWtb8FouOMYYBZ8rTwCn1YresfOSitD5UNzE-D5.

Panagiotis A. Vorkas et al., Untargeted UPLC-MS Profiling Pipeline to Expand Tissue Metabolome Coverage: Application to Cardiovascular Disease, Anal. Chem. 87, 4184-4193 American Chemical Society, (2015).

Florian Meier et al., Parallel Accumulation-Serial Fragmentation (PASEF): Multiplying Sequencing Speed and Sensitivity by Synchronized Scans in a Trapped Ion Mobility Device, J. Proteome Res. 14, 5378-5387, American Chemical Society (2015).

* cited by examiner

METHOD OF BIOANALYTICAL ANALYSIS UTILIZING ION SPECTROMETRY, INCLUDING MASS ANALYSIS

BACKGROUND OF THE INVENTION

Field of the Invention

The disclosure relates generally to analytical measurement. More specifically, this disclosure pertains to the use of ion spectrometry, including mass analysis, for the quantitation and chemical characterization (e.g., identification, ID) of biological or synthetic materials using two different ion spectrometric measurement cycles. The methods may be employed fruitfully in particular with analyte molecules of low molecular weight, such as metabolites.

Description of the Related Art

The related art is explained below with reference to a special aspect. This is not to be understood as a limitation, however. Useful further developments and modifications of what is known from the related art can also be applied above and beyond the comparatively narrow scope of this introduction, and will easily be evident to practitioners skilled in the art in this field after reading the following disclosure.

Related art has been disclosed which considers acquired ion signal descriptors to inform a prioritization for the subsequent acquisition of additional descriptors-either in the same acquisition or in a subsequent acquisition. Examples are the evaluation of tuples of liquid chromatography retention time, gas-phase ion mobility, mass-to-charge ratio and intensity acquired by LC-MS to inform a filter to further fragment selected ions in an additional high energy fragmentation.

Further methods have been disclosed to assign metabolite identities derived from a tissue analyzed with pre-ionization separation, ion mobility and MS or MS/MS to signals from the same tissue analyzed with mass/mobility imaging.

In the following, some prior art documents are listed-without any claim to completeness-which are representative of the aforementioned concepts and can be regarded as technological background of the present disclosure:

The U.S. Pat. No. 10,937,639 B2 relates to selection of precursors from a measured mobility-mass map for tandem mass spectrometry and is based on processing a peak list from measured signals and clustering these peaks in the mobility-mass space.

The U.S. Pat. No. 10,217,619 B2 discloses a method for mass spectral analysis of a sample containing a plurality of biomolecule species comprising: (a) mass analyzing a plurality of first-generation ion species generated from a sample portion; (b) automatically recognizing, for each of at least one biomolecule species, a respective subset of m/z ratios corresponding to respective first-generation ion species generated from the each biomolecule species; (c) selecting, from each recognized subset, a single representative m/z ratio; (d) isolating a sub-population of ions having each representative m/z ratio from ions having other m/z ratios; and (e) fragmenting each isolated sub-population of ions so as to generate second-generation ion species.

The U.S. Pat. No. 6,940,065 B2 presents methods for analyzing a sample which utilize a result dependent acquisition strategy. The sample may first be analyzed by MALDI and MS to produce a first result that is then used to determine a second analysis that is used to analyze the sample again by MALDI and MS/MS or MS$^n$ to produce a second result.

The U.S. Pat. No. 11,569,078 B2 discloses a method for the identification and localization of small molecule species in a histologic thin tissue section comprising the steps of: a) acquiring a mass/mobility image of the tissue section and generating a mass/mobility map of the small molecule species of interest for each pixel of the image; b) providing a second sample of the same tissue and extracting the small molecules of interest, separating them, and acquiring mass and ion mobility spectra from the separated small molecules; c) identifying the small molecules of interest using corresponding reference databases; and d) assigning identified small molecules to entries in the mass/mobility maps of the first tissue section by comparison of ion masses and mobilities of the identified species to those of the second thin tissue section.

The publication by Panagiotis A. Vorkas et al. (Anal. Chem. 2015, 87, 8, 4184-4193) describes the use of MS/MS analysis on pooled quality control (QC) samples during instrument conditioning for the purposes of generating metabolite fragmentation patterns that can be used in retrospect, following manual interrogation of the data, to support the identification of metabolites of interest.

None of the foregoing publications, however, shows the use of sample pooling for the sake of acquiring multiple descriptors, to then automatically assign derived analyte compound identities to a plurality of individual samples acquired with less descriptors for other purposes, e.g., increasing throughput or quantitative fidelity, improving measurement resolution, and the like, independent of downstream statistical analysis of the quantitative data.

In view of the foregoing, there is still a need for improving methods of bioanalytical analysis utilizing ion spectrometry, including mass analysis. Further objectives to be achieved by the present disclosure are readily apparent to the skilled person upon reading the following disclosure.

SUMMARY OF THE INVENTION

The disclosure relates to a method of bioanalytical analysis utilizing ion spectrometry, including mass analysis, comprising: —providing a pooled or otherwise composite sample which combines a plurality of individual samples, each individual sample containing a multitude of analyte compounds; —subjecting an aliquot of pooled or otherwise composite sample to a first ion spectrometric measurement cycle, which disperses the analyte compounds according to a first number of physical-chemical properties (including mass analysis), and obtaining a first spectral dataset of the thusly dispersed analyte compounds; —evaluating the first spectral dataset and obtaining a first table of annotated features therefrom; —subjecting an aliquot of one or more individual samples from the plurality of individual samples to a second ion spectrometric measurement cycle individually, the second ion spectrometric measurement cycle dispersing the analyte compounds according to a second number of physical-chemical properties (including mass analysis), being smaller than the first number of physical-chemical properties, and obtaining a second spectral dataset of the thusly dispersed analyte compounds for each of the one or more individual samples; —evaluating the second spectral dataset and obtaining a second table of annotated features therefrom for each of the one or more individual samples, wherein the evaluating and obtaining includes at least one of using, applying, referring to, and calling on the first table of annotated features; and—using at least one of the first table of annotated features and the second table of annotated features for one or more of the individual samples for characterizing one or more of the analyte compounds.

A physical-chemical property may be taken from among the group including: mass m, mass to charge ratio m/z, stability parameters for the application of radio frequency voltages to a multipole electrode structure, such as a quadrupole mass filter, time of flight, collision cross section Q, collision cross section to charge ratio Q/z, gas phase ion mobility K, drift time dt, retention time RT of liquid chromatography, and the like.

In the context of the disclosure, the term "table" may be used synonymously with one of the terms taken from among the group including: matrix, array. Thus, a table of annotated feature may equally refer to a matrix of annotated features or an array of annotated features.

The inventors have found that two essential requirements of bioanalysis can be satisfied using principles of the present disclosure: the quantitation of analyte compounds and the assignment of a chemical name to the analytical data representing those analyte compounds, herein also referred to as "annotation". In mass spectrometry (MS)-based analysis, the types of data required for each of these tasks can differ. Sensitive and accurate quantitation typically benefits from measurement of comprehensive data from the intact ionized analyte compound, while chemical assignment requires the acquisition of analyte descriptor data including but not limited to tandem mass spectrometry (MS/MS or MS2) fragmentation patterns and ion mobility separation (IMS) collisional cross section (CCS) measurements. While these data may be simultaneously acquired, improvements to data quality can be achieved by performing analyte quantitation and chemical assignment measurements separately. In so doing, results of the separate analyses must be combined in the course of post-processing.

Herein, a method is described of (i) creating distinct data tables or data matrices or data arrays for the independent purposes of analyte quantitation and analyte chemical assignment and (ii) leveraging the descriptive information common to both tables or matrices or arrays for the translation of chemical assignments from the qualitative dataset to the quantitative dataset. Within the context of this disclosure, a "feature" may be understood to be an unannotated set of signals representing a detected analyte compound. In one example, a feature may comprise one or more signal peaks in a spectral dataset, such as a mass peak, mobility peak, or chromatographic peak, and the like, as well as parameters derived therefrom.

In an analytical device, analyte compounds and their isotopologues are separated and, in the ion source, turned into ionized gas phase species that are further separated and measured with different techniques: liquid or gas chromatography as pre-ionization separations, gas phase ion mobility spectrometry, mass spectrometry and/or tandem mass spectrometry. In these different techniques, the (ionized) species produce signals that can be assigned with respective values: chromatography reports a retention time RT, ion mobility spectrometry reports ion mobility values (ion mobility K, drift time dt, collision cross section CCS), mass spectrometry reports mass-to-charge values m/z, and tandem mass spectrometry produces characteristic fragmentation spectra of m/z values. Data processing steps like de-isotoping assign mass peaks to isotope patterns, of which the signal ratios are characteristic for elemental compositions. These values are, at least within the respective analytical method, characteristic for the analyte compounds and can be used to describe and annotate the signals they produce. In the following, these values will be included in the term "descriptors".

In other words, the term "descriptor", as used in the present disclosure, encompasses a measurement that describes a property of the ion population under examination that comprises a feature or the analyte compound from which a feature is derived, for example, its mass to charge ratio (m/z) its collisional cross section (CCS), or its chromatographic retention time RT by a given method. Descriptors are used, in particular, to assign chemical identity to features in spectral data.

In various embodiments, the pooled or otherwise composite sample may combine a number of individual samples taken from among the group including: 2-10 individual samples, 10-100 individual samples, 100-1000 individual samples, 2-100 individual samples, 2-1000 individual samples, 10-1000 individual samples, and any other whole number of individual samples larger than one, including numbers also beyond 1000 individual samples. Preferably, the pooled or otherwise composite sample may be provided in liquid state. The pooling of samples may encompass the pouring together of various individual samples, or aliquots thereof, in one sample container or vessel whence it is introduced into the analytical device employed for the method.

In various embodiments, the first ion spectrometric measurement cycle may operate as liquid chromatography-ion mobility separation-tandem mass spectrometry (LC-IMS-MS/MS). Preferably, ion mobility separation may employ a gas-phase ion mobility separator taken from among the group including: travelling wave ion mobility separator (TW-IMS), trapped ion mobility separator (TIMS), field-asymmetric ion mobility separator (FAIMS), drift tube in mobility separator (DT-IMS). Further preferably, ion mobility separation-tandem mass spectrometry used in the first ion spectrometric measurement cycle may execute a procedure of parallel accumulation and serial fragmentation (PASEF®), as explained, by way of example, in the study by Florian Meier et al. (J. Proteome Res. 14, 5378-5387).

In various embodiments, tandem mass spectrometry may employ a mass filter, a fragmentation cell and a time-of-flight mass analyzer. Preferably, the mass filter may be a quadrupole mass filter. Further preferably, the fragmentation cell may employ collision induced dissociation. More further preferably, the time-of-flight mass analyzer may employ orthogonal acceleration. Alternatively, mass analysis may be carried out by a Fourier transform ion cyclotron resonance (FT-ICR) analyzer or an analyzer of the Kingdon type, such as the Orbitrap®. The mass resolution of the mass analyzer employed is preferably 10 000 or more, in particular 20 000 or more, preferably 50 000 or more and most preferably 100 000 or more, at least for selected mass ranges of interest.

In various embodiments, the second ion spectrometric measurement cycle may operate as liquid chromatography-mass spectrometry (LC-MS). Preferably, the second ion spectrometric measurement cycle operates without involving one or more measurement settings taken from among the group including: ion mobility separation, mass filtering (such as using a quadrupole mass filter), fragmentation.

In various embodiments, the first spectral dataset may encompass a mass/mobility map which plots abundance values as a function of mass or a mass-related parameter, such as m/z, and mobility or a mobility-related parameter, such as collisional cross section CCS or drift time dt.

In various embodiments, an annotated feature in the first table of annotated features may be categorized according to one or more descriptors taken from among the group including: mass m, mass-to-charge ratio m/z, isotope pattern, peak width σ, ion mobility K, collisional cross section CCS, drift time dt, retention time RT, precursor-fragment ion pattern.

In various embodiments, an annotated feature in one or more of the second tables of annotated features may be categorized according to one or more descriptors taken from among the group including: mass m, mass-to-charge ratio m/z, isotope pattern, peak width σ, retention time RT.

In various embodiments, using, applying, referring to, and calling on the first table of annotated features in the obtaining a second table of annotated features may include aligning values of selected physical-chemical properties, such as retention time or other pre-ionization separation parameter and mass or mass-related parameter, between the first spectral dataset and the corresponding second spectral dataset.

In various embodiments, using, applying, referring to, and calling on the first table of annotated features in the obtaining a second table of annotated features may include transferring information about features contained in the first table of annotated features to the corresponding second table of annotated features. Information about features may be transferred, for example, if the feature appears in both tables of annotated features, however, can be identified only in the first table of annotated features, due to the better dispersion power, and cannot be identified in the second table of annotated features, due to the lesser dispersion power.

In various embodiments, the step of subjecting an aliquot of one or more individual samples from the plurality of individual samples to a second ion spectrometric measurement cycle individually may include adding measurements of quality control (QC) samples. Preferably, measurement of QC samples may be alternated with measurement of aliquots of individual samples. Further preferably, the QC samples may be pooled or otherwise composite QC samples. Quality control samples may be pooled of all material samples available. The purpose of the QC samples may be that, due to the fact that they may be pooled, they should all be identical. If a drop in intensity for a certain feature, even if the identity of that feature is yet unknown or undetermined, is observed in the QC samples over the course of batch acquisition, it can be concluded that this drop in intensity stems from technical effects or sample degradation. In such case, it is highly unlikely that the intensity drop would be due to biological reasons as all QC samples would be pooled in the same way. This then may allow to compensate for that effect in both QC samples and also in the interspersed biological samples.

In various embodiments, the method may be expanded by at least one of outputting and visualizing at least one of the first table of annotated features and one or more of the second tables of annotated features. Preferably, the visualizing of a second table of annotated features may include showing those annotated features from the first table of annotated features that have been included in the obtaining of the second table of annotated features. Back reference from a second table of annotated features to the first table of annotated features allows tracking the post-processing of the second spectral dataset as to how certain annotations came about.

In various embodiments, at least one of evaluating the first spectral dataset and evaluating the second spectral dataset may include at least one of de-isotoping and de-adducting. De-isotoping and de-adducting may serve to consolidate isotopic features as well as features that came about due to adduction with atoms or elements other than protons (i.e., nominal mass≠unity) to simplify the spectrum and afford easier interpretation.

In various embodiments, the first table of annotated features may be used for annotation and identification of analyte compounds in the pooled or otherwise composite sample. Annotation and identification may encompass assigning a chemical name to one or more features or signal peaks, or groups thereof, such as precursor-fragment ion groups, in a spectral dataset.

In various embodiments, at least one of the second table of annotated features may be used for quantitation of analyte compounds in the corresponding individual sample. Quantitation may encompass calculating an absolute weight of analyte compound in an individual sample analyzed, or stating derived parameters, such as weight of the analyte compound by volume of the individual sample, weight of the analyte compound by total weight of the individual sample, and the like.

In various embodiments, the analyte compounds in at least one individual sample may encompass metabolites. A metabolite may be a low molecular weight compound, such as having a mass of between m/z 50 and m/z 1500 Dalton.

In various embodiments, the first ion spectrometric measurement cycle and the second ion spectrometric measurement cycle may be carried out on a same analytical device which can be operated to switch the dispersing of the analyte compounds according to at least one physical-chemical property (i) on for the first ion spectrometric measurement cycle and (ii) off for the second ion spectrometric measurement cycle.

The ordinal numbers "first" and "second" preceding the term ion spectrometric measurement cycle are not to be understood that one measurement cycle necessarily has to be performed before or after another measurement cycle. These ordinal numbers are merely used to allow concise differentiation between the two measurement cycles. For example, in the context of the present disclosure, it is possible to carry out the second ion spectrometric measurement cycle before the first ion spectrometric measurement cycle and vice versa. The post-processing of the data would not be principally affected by this reversal.

BRIEF DESCRIPTION OF THE DRAWINGS

The invention can be better understood by referring to the following figures. The elements in the figures are not necessarily to scale, emphasis instead being placed upon illustrating the principles of the invention (often schematically).

DETAILED DESCRIPTION

While the invention has been shown and described with reference to a number of different embodiments thereof, it will be recognized by those skilled in the art that various changes in form and detail may be made herein without departing from the scope of the invention as defined by the appended claims.

Figure 1:
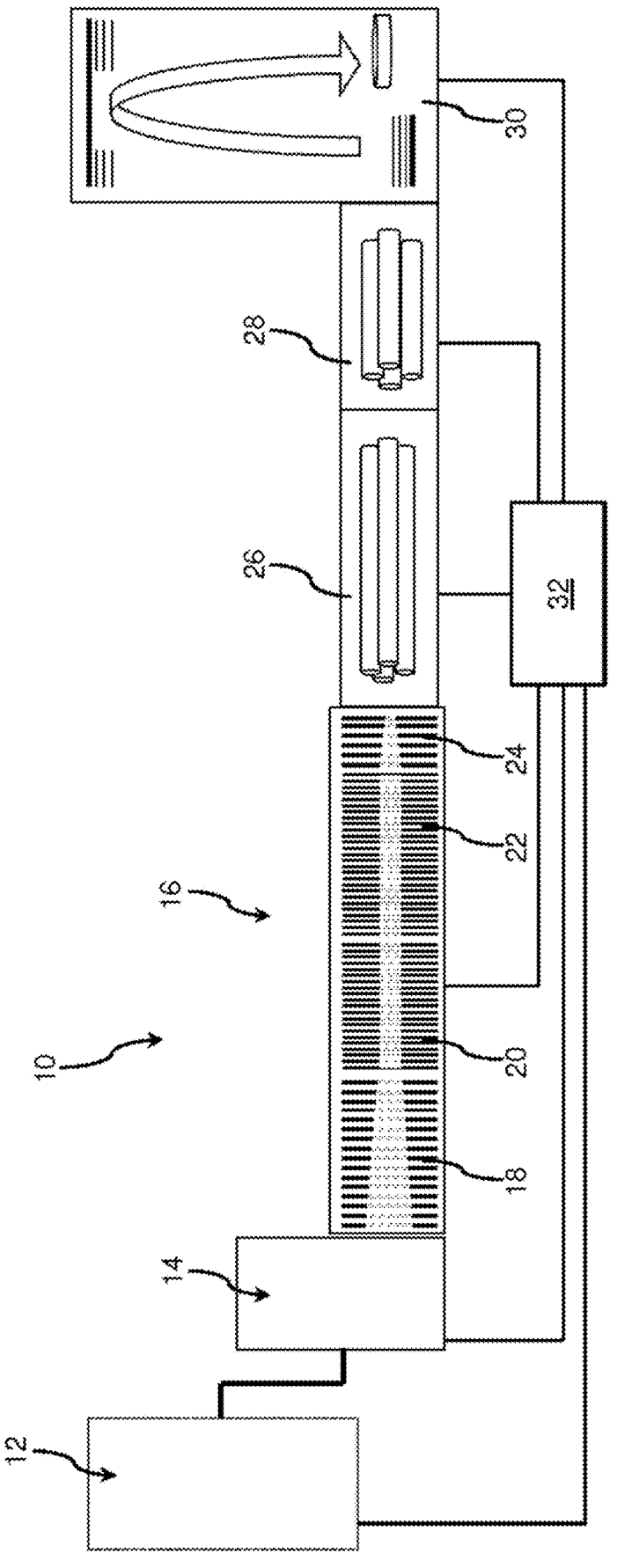
FIG. 1 (Prior Art) schematically depicts a system for combined ion mobility and mass spectrometry, which may implement principles of the present disclosure.

In FIG. 1, a system (10) for combined ion mobility and mass spectrometry analysis is shown. The system (10) comprises a sample separation device (12) for separating samples. The samples are typically biological samples, for example proteins and/or peptides and metabolites thereof, and in the embodiment shown, the sample separation device (12) may be a liquid chromatography device, but other separation devices may likewise be used, for example a capillary electrophoresis separation device, and the like.

The separated samples, or more precisely compounds of a sample, may be introduced to an ion source (14) in which they are ionized, e.g., by electrospray ionization (ESI), matrix-assisted laser desorption/ionization (MALDI), or electron impact ionization (EI), and the like, to form precursor ions. The precursor ions may be introduced into an ion mobility separator (16) which sequentially releases precursor ions according to their ion mobility. In the embodiment shown, the IMS (16) may be a so-called trapped IMS (TIMS) device, in which ions are preferably captured by the opposing forces of a gas flow and a counteracting DC electric field along an axial direction. The ions may typically be confined radially by electric RF fields.

The TIMS device (16) shown may comprise an entrance RF ion funnel (18) to collimate the beam of ions, a first TIMS (20), a second TIMS (22), and an exit RF ion funnel (24). Herein, the first TIMS (20) may be configured for constantly receiving precursor ions and transferring received precursor ions in a time-controlled manner to the second TIMS (22), and enables the execution of a method of parallel accumulation serial fragmentation (PASEF®). The second TIMS (22) may be configured for carrying out ion mobility scans in which precursor ions are successively released as ionic parcels from the second TIMS (22) according to their ion mobility. In the embodiment shown, in each ion mobility scan, precursor ions of lower ion mobility may be released prior to precursor ions of higher ion mobility. In other embodiments, the ion mobility separator may be a traveling wave IMS device (TWIMS), a drift tube IMS (dt-IMS), or a field asymmetric IMS (FAIMS). These ion mobility separators may generally release precursor ions of higher ion mobility prior to precursor ions of lower ion mobility due to different separation settings.

The ion mobility separator (16) may be operated with ion mobility separation "on" to output ion parcels sorted according to their mobility, and may likewise be operated with ion mobility separation "off" to just allow incoming ions to pass through the ion mobility separator (16) without any ion mobility separation. In the latter condition, the ion mobility separator (16) can be seen as an ion guide being (temporarily) operated at slightly elevated pressure.

Downstream of the ion mobility separator (16), a mass filter (26) is provided. The mass filter (26) may be switched to selectively transmit precursor ions having m/z values falling within a controllable mass selection window. In the shown embodiment, the mass filter may be a quadrupole RF device (26). The mass filter (26) may be operated with a narrow bandpass mode "on" to allow only ions having a comparatively narrow range of masses to pass the mass filter (26), such as within a range spanning between 1 Dalton from lower limit to upper limit, such as between 1000 Dalton and 1001 Dalton, for example, and 25 Daltons from lower limit to upper limit, such as between 1000 Dalton and 1025 Dalton, for example, and may likewise be operated with the narrow bandpass mode "off", or in other words, in an RF only mode, to allow substantially all incoming ions to pass the mass filter (26) without narrow bandpass selection.

Precursor ions falling into the current mass window of the quadrupole RF device (26) may be forwarded to a fragmentation apparatus (28) in which the precursor ions may be fragmented into fragment ions. In the shown embodiment, the fragmentation apparatus may be a collision cell (28) in which a neutral gas atmosphere at slightly elevated pressure is kept and into which ions may be injected after acceleration for the purpose of fragmenting them using collisions with the gas molecules, such as molecular nitrogen or sulfur hexafluoride, or mixtures thereof. However, other types of fragmentation apparatus are likewise possible, such as surface induced dissociation fragmentation devices, electron transfer dissociation (ETD) devices, electron capture dissociation (ECD) devices, ultraviolet photo-induced dissociation (UVPD) devices, and the like.

The collision cell (28) may be operated with a fragmenting mode "on" to dissociate incoming ions and produce fragment ions therefrom, and may likewise be operated with a fragmenting mode "off" to just accept and temporarily store incoming ions without breaking them apart into fragments and passing them on to the next component in the system (10).

The system (10) may further comprise a mass analyzer (30), which carries out a mass measurement on the fragment ions, and as the case may be, on the precursor ions. In the shown embodiment, the mass analyzer is a time-of-flight (TOF) analyzer utilizing orthogonal injection and having a reflector for extending the flight path and improve mass resolution.

Finally, the system (10) comprises a control system (32) which is configured to coordinate and control each of the components of the system (10) and to also carry out the data analysis of the mass spectra obtained by the TOF analyzer (30), which form part of a spectral dataset. The control system (32) may comprise one or more microprocessors as well as a memory for storing suitable computer code for carrying out system control and data analysis functions. The control system (32) may be a single unit, or may be a distributed system comprising different control units with individual processors and and/or dedicated control circuits, ASICs, and the like, which are in data communication with each other. Contrary to the depiction in FIG. 1, the control system (32) may be organized de-centrally, i.e., various subparts may be located spaced apart at different components of the overall analytical system (10).

The system (10) shown in FIG. 1 may work in various modes of operation of which two stand out, which may be referred to as the MS1 and MS2 modes (the latter being called also tandem MS or MS/MS), respectively. When operated in the MS1 mode, the ion mobility separator (16), mass filter (26) and collision cell (28) may be deactivated, such that all precursor ions sequentially released from the second TIMS (22) are conveyed to the TOF analyzer (30) without mobility separation, mass selection and fragmentation, to thereby obtain high resolution m/z spectra of the precursor ions at high speed. The precursor ions are further associated with a corresponding retention time of the chromatography device (12) or other separation parameter of a pre-ionization separator.

When operated in the MS2 mode, the ion mobility separator (16), mass filter (26) and fragmentation cell (28) may be activated, such that the incoming precursor ions are mobility-separated, selected according to the mass selection window of the mass filter (26) set and then fragmented in the collision cell (28), to thereby obtain high resolution m/z spectra of the fragment ions resulting from the precursor ions in the collision cell (28), which enables the sorting of the features in a spectral dataset resulting therefrom according to a higher number of physical-chemical properties than in the MS1 mode. It goes without saying that the fragment ions may be associated with a corresponding mobility or mobility-related value, such as collisional cross section CCS or voltage setting of the second TIMS (22) upon release, and retention time of the chromatography device (12) or other separation parameter of a pre-ionization separator.

Figure 2:
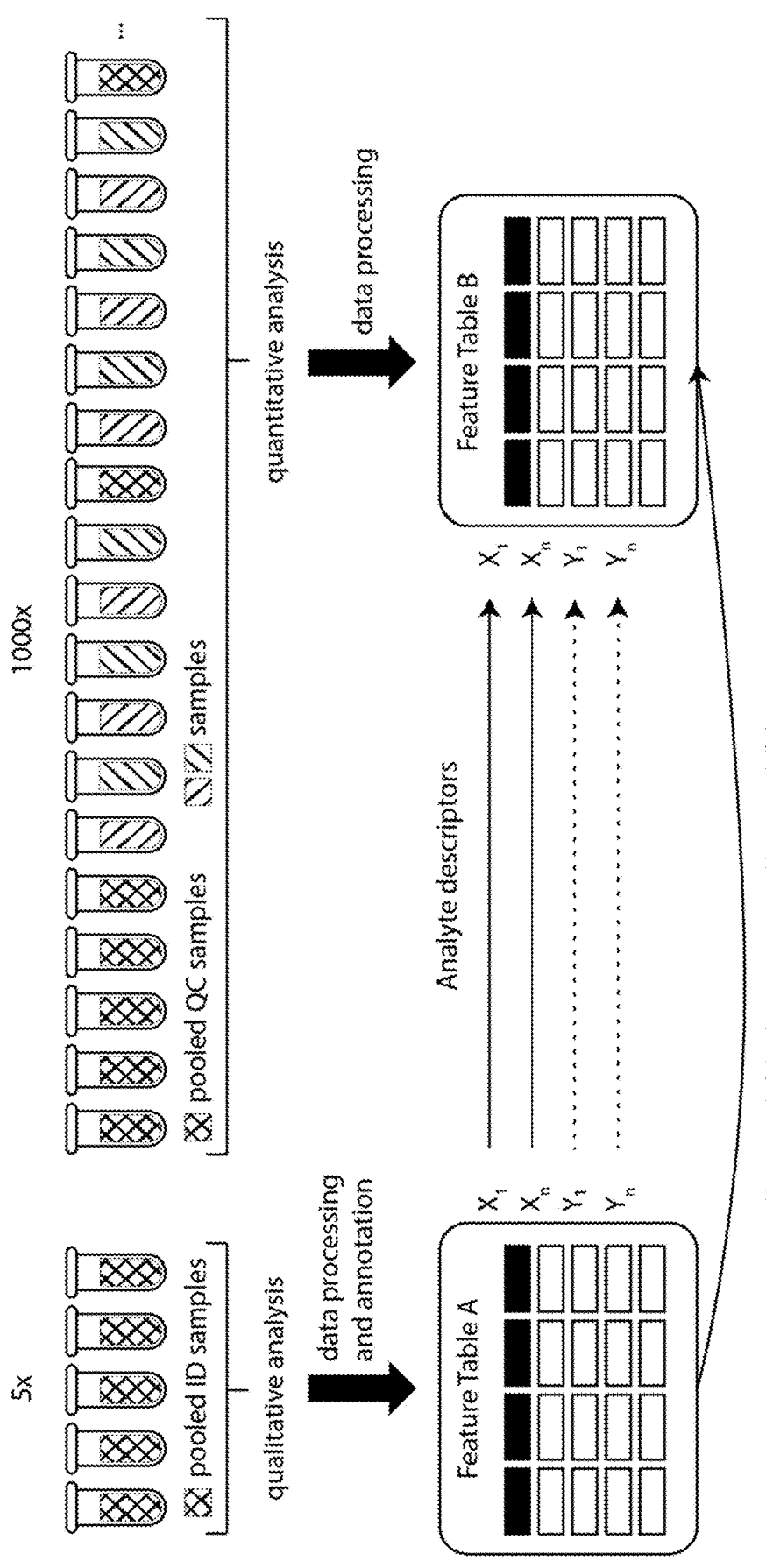
FIG. 2 schematically depicts: (1) the independent creation of two feature tables or matrices or arrays, one arising from a qualitative analysis of analyte compounds in a pooled or otherwise composite material sample, and the other arising from a quantitative analysis of analyte compounds in a single or individual material sample; (2) the matching of analyte descriptors $(X_1\text{-}X_n, Y_1\text{-}Y_n)$ existing in both feature tables or matrices or arrays and the transfer of other analyte descriptors existing only in the feature table of the qualitative analysis to the feature table arising from the quantitative analysis.

An exemplary embodiment according to principles of the present disclosure, which may be executed using the analytical device or system explained with reference to FIG. 1, will be expounded in the following:

A first set of raw data acquired from pooled material samples with a first instrumental configuration (defined herein as a physical configuration of analyzers, or the selected use of a subset of analyzers in a defined and static physical configuration) and a second set of raw data acquired from individual material samples with a second, differing instrumental configuration are processed separately (FIG. 2, bold vertical arrows pointing downward). The processing may comprise signal detection, de-isotoping, and ion deconvolution to collate detected features, followed by feature alignment, retention time alignment, mass calibration, mobility calibration, and/or extraction and assignment of MS/MS spectra (bold vertical arrow on the left).

Comparable material samples may be produced in large numbers during a regular screening activity, such as body fluid samples (e.g., urine) from patients in a clinical environment, or water samples from environmental monitoring, and the like. One exemplary application of the methods presented in the present disclosure may be the investigation of large patient cohorts to compare healthy patients with patients suffering from one or diverse diseases. One concrete example may be healthy condition vs. Covid condition vs. Influenza condition. Another might be healthy condition vs. light Covid condition vs. severe Covid condition vs. lethal Covid condition. In such scenario, the investigator would be interested in the statistical comparison between the groups mustered from the cohort, which is why a quantitative table of annotated features would be very important, and also wants to be pointed towards certain biological pathways which seem to be most affected by the disease, which is why an associated qualitative table of annotated features would be important.

The qualitative feature table (Feature Table A), resulting from the first set of pooled or otherwise composite material samples, may be subjected to one or more methods of feature annotation, which may be manual annotation, rule-based annotation, annotation based on reference libraries, and the like. These annotation methods may rely on one or more descriptors acquired by, or deduced from the first instrumental configuration, like mass-to-charge ratio, isotopic pattern, retention time, MS/MS spectra, such as precursor-fragment ion pattern, and/or ion mobility. These descriptors and respective tolerances may be used to accept or discard annotations and in case of acceptance to assign descriptor-dependent annotation confidence scores. The annotation confidence scores may thus be based on the deviations of descriptors between measured and expected values.

The quantitative feature table (Feature Table B), resulting from the second set of individual material samples (FIG. 2, bold vertical arrow on the right), may be subjected to annotation based on the annotations assigned to the qualitative feature table. Descriptors of features in the quantitative feature table, with their respective tolerances, may be matched against the respective descriptors of the annotations in the qualitative feature table. These descriptors of the annotations in the quantitative feature table may be favorably calculated or predicted from the annotated molecular formulae or structures but may also be replaced with the descriptors measured from the first qualitative dataset. Descriptors that have been acquired by the first instrumental configuration from pooled material samples but have not been acquired by the second instrumental configuration from the second set of individual samples, may be transferred to the feature in the quantitative feature table, if the annotation is assigned.

The descriptor dependent annotation confidence scores in the quantitative feature table may consequently be based on descriptors found in the quantitative feature table, and optionally additionally also be based on descriptors found exclusively in the qualitative feature table. The descriptors assigned from features in the qualitative feature table to features in the quantitative feature table may be marked as referenced descriptors, to clarify that they are not originally acquired from the second set of material samples, but are references to the qualitative feature table based on the pooled material samples.

These references allow for connectivity between features in the quantitative feature table (FIG. 2, Feature Table B) and analyte descriptors ascertained and reported in the qualitative feature table (FIG. 2, Feature Table A). Examples may be MS/MS spectra, such as precursor-fragment ion pattern, or ion mobility values, which support the annotation confidence in the quantitative feature table, though they have not been acquired from the corresponding individual material sample set.

Instead of pooled samples, the method may also be applied to otherwise composite samples for generation of the qualitative feature table.

The second individual sample set may also be interspersed with pooled samples, for example for the sake of quality control or within-batch correction.

Figure 3:
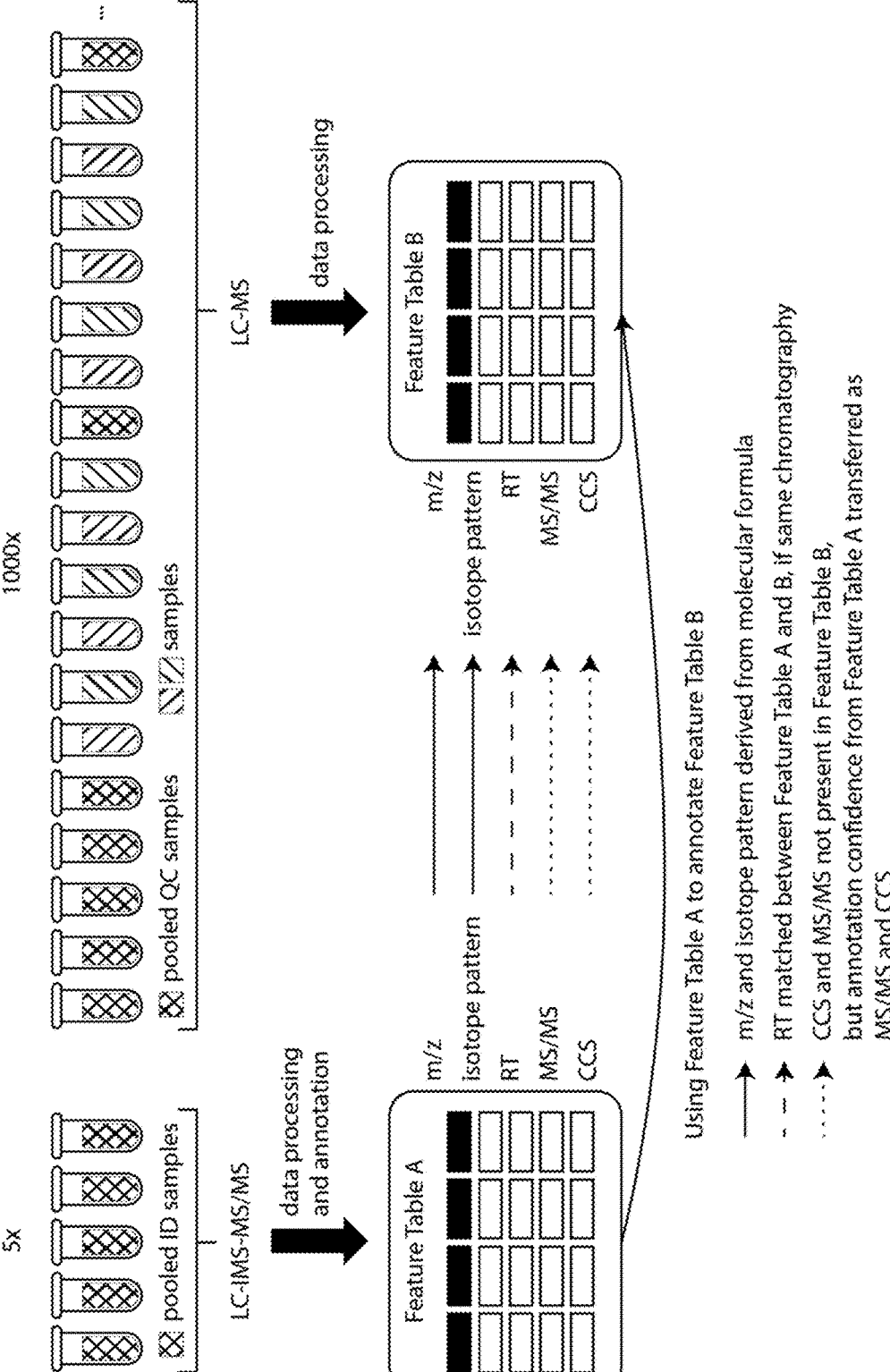
FIG. 3 schematically depicts a practical application of the generalized concept whereby: —A "pooled ID sample" comprising parts of some or all material samples intended for quantitation is qualitatively analyzed to determine the analyte composition of the pooled material sample with a maximum number of descriptors available from the technologies applied. In this case, liquid chromatography (LC), ion mobility separation (IMS), and tandem mass spectrometry (MS/MS) with high resolution mass spectrometry (HRMS) detection are used to ascertain the maximum possible number of analytical descriptors per analyte compound including HRMS-derived m/z, isotope pattern, LC retention time (or derivative measure, such as retention index or elution order), MS/MS fragmentation pattern, and IMS-derived collisional cross section (CCS); —Individual material samples are quantitatively analyzed for the purposes of measuring the abundance (in relative or absolute terms) of the analyte compounds they contain. Quantitation may be enhanced by focusing on some analyte descriptors (e.g., with a higher sampling rate) and omitting others, reducing the total number of analyte descriptors available in Feature Table B when comparing to those available in Feature Table A.

In a concrete example, the qualitative feature table may be derived from pooled material samples with a liquid chromatography-ion mobility separation-tandem mass spectrometer (LC-IMS-MS/MS). The quantitative feature table might be derived from the individual material samples, interspersed with pooled material samples for quality control purposes, with a liquid chromatography-mass spectrometer (LC-MS). This example is depicted in FIG. 3.

The first instrumental configuration may provide information for the following analyte descriptors: mass-to-charge ratio, isotope pattern, retention time, MS/MS spectra, such as precursor-fragment ion pattern, and ion mobility or properties related to the aforementioned. The second instrumental configuration may provide information for less analyte descriptors: e.g., mass-to-charge ratio, isotope pattern and retention time.

The qualitative Feature Table A may be subjected to different methods of feature annotation based on one to five of the available analyte descriptors.

The annotated features from the qualitative Feature Table A may be matched to the features in the quantitative Feature Table B, using one to three of the descriptors (and respective tolerances) available in the quantitative Feature Table B. In case of a match, the annotation may be transferred from the first Feature Table A to the second Feature Table B. The annotation confidence scores for the new annotation in the quantitative Feature Table B may be created differently, depending on their origin:

The theoretical mass-to-charge ratio and isotope pattern may be calculated from the molecular formula of the transferred annotation. The deviation between these theoretical values and the measured values in the quantitative Feature Table B may be calculated and used to accept or discard the annotation. In case of acceptance, the deviation may be used to assess the annotation confidence.

The retention time may either be matched between the qualitative Feature Table A and the quantitative Feature Table B, between a reference retention time and the quantitative Feature Table B, or it may be ignored if retention times are not expected to be equal between the feature tables. In the first two cases, the respective retention time deviations may be considered to assess the annotation confidence. In the latter case the retention time deviation of the annotation in the qualitative Feature Table A may be referenced.

Figure 4:
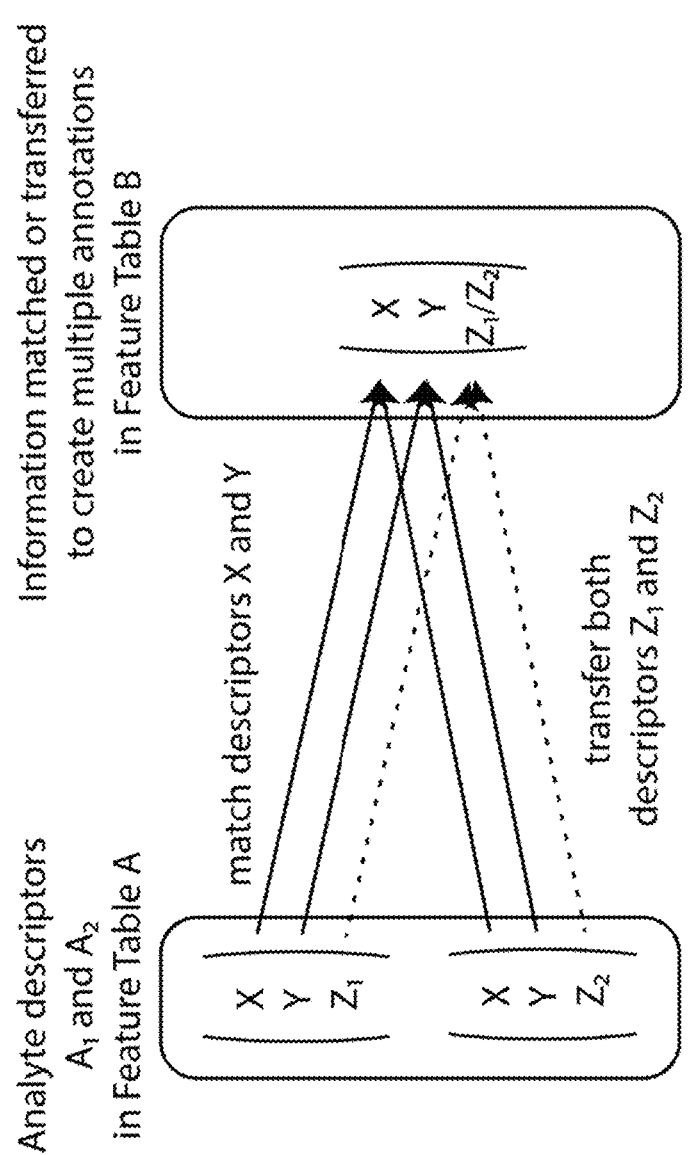
FIG. 4 schematically depicts the method of translating chemical assignments from Feature Table A to Feature Table B by way of (1) matching shared descriptors and (2) transferring those that only occur in Feature Table A. Where the additional descriptors measured and reported in Feature Table A allow for the differentiated annotation of multiple distinct analyte compounds, whereas the descriptors measured and reported in Feature Table B do not, the method is capable of combining assignments and clearly highlighting resulting ambiguity.

MS/MS spectra and ion mobilities may not be present in the quantitative Feature Table B. Annotations created in the quantitative Feature Table B, based on the matching with the qualitative Feature Table A, may reference the MS/MS scores and ion mobility deviations in the original annotations of the qualitative Feature Table A. Multiple distinct analyte compounds, distinguished by a separation only in ion mobility, which are represented by their corresponding features in the qualitative Feature Table A, will not be represented by separate features in the quantitative Feature Table B. In that case, annotations from multiple features in the qualitative Feature Table A may be assigned to a single feature in the quantitative Feature Table B. This is schematically depicted in FIG. 4.

Annotation confidence scores in the quantitative feature table may be based on a mixture of matches against theoretical values, such as theoretical m/z and isotope pattern, matches against reference values, such as retention time RT, and referenced scores, such as MS/MS match score and CCS match score, or two separate annotation confidence scores may be reported, of which a first describes the match of the feature between the quantitative feature table and the qualitative feature table, and a second fully references the annotation confidence of the respective annotation in the qualitative feature table.

In alternative wording, the present disclosure relates to a method of bioanalytical analysis utilizing mass spectrometry (MS) and resulting data analysis, comprising:

providing a pooled, composite, or representative material sample (referred to herein simply as a "pooled" sample) intended to support detailed characterization of the analyte compounds contained within that material sample;

subjecting an aliquot of the pooled, composite, or representative material sample to a set of measurements, for example using liquid chromatography-ion mobility separation-tandem mass spectrometry (LC-IMS-MS/MS), and obtaining a first dataset which delivers a maximum number of descriptors per analyte;

evaluating the first dataset and producing a table or matrix or array of detected analyte compounds with high confidence chemical annotation based on the use of multiple analyte descriptors;

subjecting individual material samples intended for quantitative analyte measurement to an independent set of measurements at reduced complexity, for example using liquid chromatography-mass spectrometry (LC-MS), and obtaining a distinct quantitative dataset;

evaluating the quantitative dataset and producing a table of detected analytes with high accuracy quantitation across the individual samples; and combining the multi-dimensional descriptor data and resulting high confidence chemical annotations from the qualitative feature table with their respective analyte measurements in the second quantitative feature table by way of matching and transferring analyte descriptors, wherein the evaluating and obtaining includes at least one of using, applying, referring to, and calling on the first table of annotated features; and using at least one of the first table of annotated features and the second table of annotated features for characterizing one or more of the analyte compounds.

The workflow intends to separate the ascertaining of highly confident analyte compound annotations from the acquisition of a highly quantitative dataset in a mass spectrometry-based analysis of small molecules, such as metabolites.

Measurements of tens to thousands of individual samples may be acquired using separation in liquid chromatography (LC) and a mass analyzer. The resulting data may be processed to find peaks in an untargeted fashion. De-isotoping may be applied to combine peaks into isotope patterns deriving from the same analyte compound—in the following called feature. Here, features may be described by their retention time (RT) in the liquid chromatography dimension, or another parameter for a pre-ionization separation mechanism, and the mass-to-charge ratio (m/z) of the monoisotopic peak. These features may be aligned across the measurements, both in terms of retention time and m/z, to create a quantitative feature matrix.

Additionally, a small number of pooled samples of the above-mentioned individual samples may be acquired using separation in liquid chromatography, using an ion mobility separator (IMS), a mass analyzer (MS1) and additional ion fragmentation (MS2). These pooled samples may be acquired for the sake of sample characterization. The resulting data may be processed to find peaks in an untargeted fashion. De-isotoping may be applied to combine peaks into isotope patterns deriving from the same analyte compound. Here, features may be described by their retention time in the liquid chromatography dimension, by their ion mobility or collision cross section, and by the mass-to-charge ratio (m/z) of the monoisotopic peak. MS2 spectra may be associated with the respective precursor ion peaks. These features may be aligned across the measurements, in terms of retention time, ion mobility and m/z, to create a quantitative feature matrix. These features may be subjected to analyte compound annotation or identification, making use of the acquired retention times, ion mobilities or collisional cross sections, m/z values and MS2 fragmentation spectra, such as precursor-fragment ion pattern. These criteria allow for highly confident annotations. The gained annotations may then be transferred to the quantitative feature matrix, based on a matching of retention time and mass-to-charge ratio.

The quantitative feature matrix may now contain features acquired by liquid chromatography and a mass analyzer, but is annotated based on information acquired by liquid chromatography, ion mobility or collision cross section (CCS), a mass analyzer and MS2 fragmentation spectra, i.e., from spectral data the analyte compounds of which have been dispersed according to a higher number of physical-chemical properties. The initial acquisition, as a higher portion of the duty cycle is spent on MS1, is most suitable for quantitation. The qualitative acquisition, additionally making use of ion mobility separation and MS2 fragmentation and therefore taking longer, is most suitable for the task of analyte compound annotation and identification. The complete workflow combines the quantitative power of the initial acquisition with the highly confident annotation capabilities of the following acquisition. Therein, the sequence of qualitative acquisition and quantitative acquisition is reversible, of course, as has been explained before.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention which is defined solely by the appended claims, including any equivalent implementations, as the case may be.

The invention claimed is:

1. A method of bioanalytical analysis utilizing ion spectrometry, including mass analysis, comprising:

providing a pooled or otherwise composite sample which combines a plurality of individual samples, each individual sample containing a multitude of analyte compounds;

subjecting an aliquot of pooled or otherwise composite sample to a first ion spectrometric measurement cycle, which disperses the analyte compounds according to a first number of physical-chemical properties, and obtaining a first spectral dataset of the thusly dispersed analyte compounds;

evaluating the first spectral dataset and obtaining a first table of annotated features therefrom;

subjecting an aliquot of one or more individual samples from the plurality of individual samples to a second ion spectrometric measurement cycle individually, the second ion spectrometric measurement cycle dispersing the analyte compounds according to a second number of physical-chemical properties, being smaller than the first number of physical-chemical properties, and obtaining a second spectral dataset of the thusly dispersed analyte compounds for each of the one or more individual samples;

evaluating the second spectral dataset and obtaining a second table of annotated features therefrom for each of the one or more individual samples, wherein the evaluating and obtaining includes at least one of using, applying, referring to, and calling on the first table of annotated features; and using at least one of the first table of annotated features and the second table of annotated features for one or more of the individual samples for characterizing one or more of the analyte compounds.

2. The method of claim 1, wherein the pooled or otherwise composite sample is provided in liquid state.

3. The method of claim 1, wherein the first ion spectrometric measurement cycle operates as liquid chromatography-ion mobility separation-tandem mass spectrometry (LC-IMS-MS/MS).

4. The method of claim 3, wherein ion mobility separation employs a gas-phase ion mobility separator taken from among the group including: travelling wave ion mobility separator (TW-IMS), trapped ion mobility separator (TIMS), field-asymmetric ion mobility separator (FAIMS), drift tube in mobility separator (DT-IMS).

5. The method of claim 3, wherein ion mobility separation-tandem mass spectrometry used in the first ion spectrometric measurement cycle executes a procedure of parallel accumulation and serial fragmentation (PASEF®).

6. The method of claim 3, wherein tandem mass spectrometry employs a mass filter, a fragmentation cell and a time-of-flight mass analyzer.

7. The method of claim 6, wherein the mass filter is a quadrupole mass filter.

8. The method of claim 6, wherein the fragmentation cell employs collision induced dissociation.

9. The method of claim 6, wherein the time-of-flight mass analyzer employs orthogonal acceleration.

10. The method of claim 1, wherein the second ion spectrometric measurement cycle operates as liquid chromatography-mass spectrometry (LC-MS).

11. The method of claim 1, wherein the second ion spectrometric measurement cycle operates without involving one or more measurement settings taken from among the group including: ion mobility separation, mass filtering, fragmentation.

12. The method of claim 1, wherein the first spectral dataset encompasses a mass/mobility map which plots abundance values as a function of mass or a mass-related parameter and mobility or a mobility-related parameter.

13. The method of claim 1, wherein an annotated feature in the first table of annotated features is categorized according to one or more descriptors taken from among the group including: mass m, mass-to-charge ratio m/z, isotope pattern, peak width σ, ion mobility K, collisional cross section CCS, drift time dt, retention time RT, precursor-fragment ion pattern.

14. The method of claim 1, wherein an annotated feature in one or more of the second tables of annotated features is categorized according to one or more descriptors taken from among the group including: mass m, mass-to-charge ratio m/z, isotope pattern, peak width σ, retention time RT.

15. The method of claim 1, wherein using, applying, referring to, and calling on the first table of annotated features in the obtaining a second table of annotated features includes aligning values of selected physical-chemical properties between the first spectral dataset and the corresponding second spectral dataset.

16. The method of claim 1, wherein using, applying, referring to, and calling on the first table of annotated features in the obtaining a second table of annotated features includes transferring information about features contained in the first table of annotated features to the corresponding second table of annotated features.

17. The method of claim 1, wherein the step of subjecting an aliquot of one or more individual samples from the plurality of individual samples to a second ion spectrometric measurement cycle individually includes adding measurements of quality control (QC) samples.

18. The method of claim 17, wherein measurement of QC samples is alternated with measurement of aliquots of individual samples.

19. The method of claim 17, wherein the QC samples are pooled or otherwise composite QC samples.

20. The method of claim 1, further comprising at least one of outputting and visualizing at least one of the first table of annotated features and one or more of the second tables of annotated features.

21. The method of claim 20, wherein the visualizing of a second table of annotated features includes showing those annotated features from the first table of annotated features that have been included in the obtaining of the second table of annotated features.

22. The method of claim 1, wherein at least one of evaluating the first spectral dataset and evaluating the second spectral dataset includes at least one of de-isotoping and de-adducting.

23. The method of claim 1, wherein the first table of annotated features is used for annotation and identification of analyte compounds in the pooled or otherwise composite sample.

24. The method of claim 1, wherein at least one of the second tables of annotated features is used for quantitation of analyte compounds in the corresponding individual sample.

25. The method of claim 1, wherein the analyte compounds in at least one individual sample encompass metabolites.

26. The method of claim 1, wherein the first ion spectrometric measurement cycle and the second ion spectrometric measurement cycle are carried out on a same analytical device which can be operated to switch the dispersing of the analyte compounds according to at least one physical-chemical property (i) on for the first ion spectrometric measurement cycle and (ii) off for the second ion spectrometric measurement cycle.

* * * * *